United States Patent
Kuang et al.

(10) Patent No.: US 10,262,023 B1
(45) Date of Patent: Apr. 16, 2019

(54) MANAGING DATA INCONSISTENCIES IN FILE SYSTEMS

(71) Applicant: EMC Corporation, Hopkinton, MA (US)

(72) Inventors: Yaming Kuang, Shanghai (CN); Yingchao Zhou, Beijing (CN); Srinivasa Rao Vempati, Upton, MA (US); William C. Davenport, Burlington, MA (US); Jean-Pierre Bono, Westborough, MA (US); Marshall Hansi Wu, Shanghai (CN); James O. Owens, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 409 days.

(21) Appl. No.: 14/501,855

(22) Filed: Sep. 30, 2014

(51) Int. Cl.
*G06F 17/30* (2006.01)

(52) U.S. Cl.
CPC .............. *G06F 17/30371* (2013.01)

(58) Field of Classification Search
CPC ......... G06F 17/30067; G06F 17/30091; G06F 17/30008; G06F 17/30371; G06F 11/0793; G06F 11/1435; G06F 11/0781; G06F 11/00; G06F 17/30159; G06F 17/30227; G06F 17/30088; G06F 17/30185; G06F 17/30218; G06F 17/30132
USPC .............. 714/2; 1/1; 707/649, 691
See application file for complete search history.

(56) References Cited

U.S. PATENT DOCUMENTS

| | | | | |
|---|---|---|---|---|
| 7,024,527 B1* | 4/2006 | Ohr | ...................... | G06F 11/1469 100/154 |
| 7,506,213 B1* | 3/2009 | Cabrera, III | ........ | G06F 11/0727 714/26 |
| 7,882,386 B1* | 2/2011 | Potnis | ................. | G06F 11/1435 714/2 |
| 8,130,554 B1* | 3/2012 | Linnell | .................. | G11C 16/14 365/185.28 |
| 8,190,850 B1* | 5/2012 | Davenport | ........ | G06F 17/30067 711/170 |
| 8,301,602 B1* | 10/2012 | Jiang | ................. | G06F 17/30129 707/649 |
| 8,442,952 B1* | 5/2013 | Armangau | ........ | G06F 17/30159 706/14 |
| 8,612,382 B1* | 12/2013 | Patel | ................... | G06F 11/0727 707/609 |
| 8,661,068 B1* | 2/2014 | Seibel | ................ | G06F 17/30132 707/825 |
| 8,943,282 B1* | 1/2015 | Armangau | ........ | G06F 17/30088 711/126 |
| 9,020,903 B1* | 4/2015 | Vempati | ................ | G06F 12/121 707/674 |
| 9,213,717 B1* | 12/2015 | Pawar | ............... | G06F 17/30171 |
| 9,424,151 B2* | 8/2016 | Lakshman | .......... | G06F 11/2058 |
| 9,558,068 B1* | 1/2017 | Bono | .................. | G06F 11/1412 |
| 2003/0182312 A1* | 9/2003 | Chen | ................... | G06F 11/1435 |

(Continued)

*Primary Examiner* — Dennis Truong
(74) *Attorney, Agent, or Firm* — Krishnendu Gupta; Deepika Bhayana

(57) ABSTRACT

A method is used in managing data inconsistencies in file systems. A data inconsistency is detected in a file system data block of a file system. The file system includes a set of file system data blocks. Information regarding the data inconsistency is provided to a client of the file system. Based on the information, the client is enabled to determine an action for recovering from the data inconsistency.

20 Claims, 11 Drawing Sheets

(56) References Cited

U.S. PATENT DOCUMENTS

| | | | |
|---|---|---|---|
| 2007/0067256 A1* | 3/2007 | Zayas | G06F 17/30091 |
| 2008/0040385 A1* | 2/2008 | Barrall | G06F 17/30203 |
| 2012/0072656 A1* | 3/2012 | Archak | G06F 17/30132 |
| | | | 711/104 |
| 2012/0151273 A1* | 6/2012 | Ben Or | G06F 9/45533 |
| | | | 714/41 |
| 2013/0204849 A1* | 8/2013 | Chacko | G06F 3/0604 |
| | | | 707/692 |

* cited by examiner

LOGICAL VIEW MAPPED TO FILESYSTEM BLOCKS

MANAGING DATA INCONSISTENCIES IN FILE SYSTEMS

BACKGROUND

Technical Field

This application relates to managing data inconsistencies in file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways.

Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

SUMMARY OF THE INVENTION

A method is used in managing data inconsistencies in file systems. A data inconsistency is detected in a file system data block of a file system. The file system includes a set of file system data blocks. Information regarding the data inconsistency is provided to a client of the file system. Based on the information, the client is enabled to determine an action for recovering from the data inconsistency.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
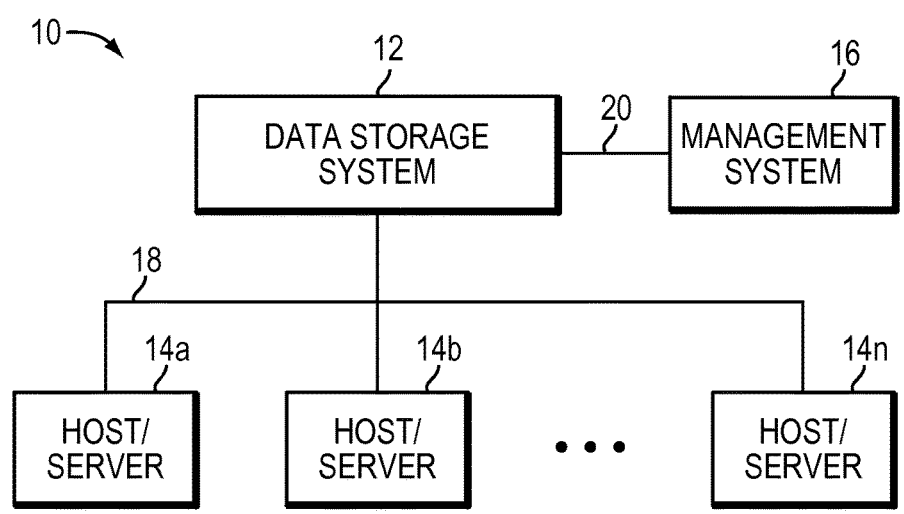
FIGS. 1 and 2 are examples of an embodiment of a computer system that may utilize the techniques described herein.

Described below is a technique for use in managing data inconsistencies in file systems, which technique may be used to provide, among other things, detecting a data inconsistency in a file system data block of a file system, where the file system includes a set of file system data blocks; providing information regarding the data inconsistency to a client of the file system, and based on the information, enabling the client to determine an action for recovering from the data inconsistency.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

The loss or corruption of metadata of a file system can result in inconsistencies or corruption of the file system. It should be appreciated that such corruptions or inconsistencies may develop in any one of numerous ways, including hardware failures, software bugs, and so on.

File System Checking (FSCK) is a process by which a data storage system verifies integrity of a file system and optionally repairs any inconsistencies found during verification of the file system. In at least some systems, a FSCK utility verifies metadata of a file system, recovers inconsistent metadata to a consistent state and thus restores the integrity of the file system. To verify metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

Generally, a data storage system may communicate with a virtual server (e.g., a virtual data center manager client or simply referred to as "virtual client") in a virtual system infrastructure. Further, a virtual system infrastructure may be provided by any one of the vendors such that examples of virtualization systems include commercial implementations, such as, for example and without limitation, VMware® ESX Server™ (VMware and ESX Server are trademarks of VMware, Inc.), VMware® Server, and VMware® vSphere™, available from VMware, Inc., Palo Alto, Calif.; operating systems with virtualization support; and open-source implementations such as, for example and without limitation, available from XenSource, Inc. Generally, in such a virtualized environment, a file may be exported to a virtual client and used by the virtual client as a logical block device. For example, in such a virtualized environment, storage space may be provisioned from a storage pool of a data storage system and used as a virtual disk (e.g., Virtual Machine Disk ("VMDK")) by a virtual client in communication with the data storage system. In such a case, a logical block device used as a virtual disk may be formatted with a virtual client operating system (e.g., VMware virtualization software) with a file system format (e.g., Microsoft® Windows™ New Technology File System ("NTFS")). Further, a logical volume exported to a virtual client as a virtual disk may be organized as a file system on a storage device. In such a case, a file system block of a file system hierarchy of a file organized as a logical volume on a data storage system and exported as a virtual disk to a virtual client may become inconsistent (also referred to herein as "corrupted") due to any number of reasons such as a software bug, loss of data in a cache, or inconsistent data in a cache.

Conventionally, if an inconsistent file system block is detected in a file system hierarchy of a file system, the file system is taken offline, marked as an inactive file system and a FSCK utility is executed to recover inconsistencies in the file system. Thus, in such a conventional system, if a file system block is marked as a bad block upon detecting data inconsistency in the file system block, the file system block is recovered by FSCK utility by updating contents of the file system block (e.g., by writing zeros to the file system block) before providing the updated file system block to a client (e.g., a virtual client) indicating that the file system block has been recovered. Consequently, in such a conventional system, a client using a logical volume organized as a file system is unable to make any determination regarding what action to take when data inconsistency occurs in the file system. Instead, in such a conventional system, an inconsistent file system block is updated by writing zeros to the inconsistent file system block by FSCK utility and the updated file system block is provided to a client. Further, in such a conventional system, a client's operating system usually have a capability to recover an inconsistent file system block by using any one of the mechanisms such as using duplicate metadata in case the inconsistent file system block includes metadata of the client's operating system. Thus, in such a conventional system, even when a client's operating system has a capability to recover contents of an inconsistent file system block, contents of the inconsistent file system block are updated with zeros by FSCK utility thereby losing contents of the file system block. Further, in such a conventional system, writing zeros to an inconsistent file system block results in a data loss in such a way that if a partial write request writes data to a portion of the inconsistent file system block, remaining portion of the file system block is updated with zeroes by FSCK utility. In such a conventional system, when a client's operating system attempts to read contents of an inconsistent file system block where a portion of the inconsistent file system block has been written with zeros by FSCK utility as described above herein, the updated file system block including zeros as its contents is provided to a user of the client thereby losing the user data without providing any notification to the user. Thus, in such a conventional system, a user of a virtual client in communication with a storage system does not get an opportunity to handle an inconsistent file system block situation and is unable to take any precautionary action because FSCK utility automatically writes zeros to a portion of the inconsistent file system block upon receiving a partial write request to write to a portion of the inconsistent file system block.

By contrast, in at least some implementations in accordance with the technique as described herein, instead of FSCK utility, a client of a logical volume organized as a file system on a storage system makes a determination regarding a type of action that is required upon detecting an inconsistent file system block in the file system. Thus, in at least one embodiment of the current technique, upon detecting an inconsistent file system block in a file system, an I/O error is reported back to a client of the file system with information regarding data inconsistency such as name of a file of the file system, path name of the file, and an offset at which inconsistent file system block resides instead of writing zeros to the inconsistent file system block by FSCK utility thereby enabling to the client to make a determination as to what action is required based on the I/O error and information provided to the client thereby avoiding data loss. Thus, in at least one embodiment of the current technique, enabling a client of a logical volume organized as a file system on a storage system to handle an inconsistent file system block situation allows the client to take an one of the following actions. In such a case, for example, one such action that client may take is to either take the entire logical volume offline or mark only that portion of the logical volume as inconsistent which has been reported by a file system logic of the storage system as inconsistent. Further, in such a case, for example, another action that client may take is to start a background process to fix data inconsistencies in file system blocks that have been reported as inconsistent file system blocks. Further, in such a case, for example, another action that client may take is to start a backup procedure to save user data at a regular time interval such that upon receiving information regarding inconsistent file system blocks, data inconsistencies may be resolved using user data that has been saved by the backup procedure.

In at least some implementations in accordance with the technique as described herein, the use of the managing data inconsistencies in file systems technique can provide one or more of the following advantages: preventing unavailability of user data by efficiently recovering inconsistent file system blocks of a file system by enabling a client of the file system to make a determination regarding what action to take, preventing zeroing of contents of inconsistent file system blocks by enabling a client to make a determination regarding how to update contents of the inconsistent file system blocks, and reducing data loss upon detecting inconsistent file system blocks by efficiently managing and processing the inconsistent file system blocks.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
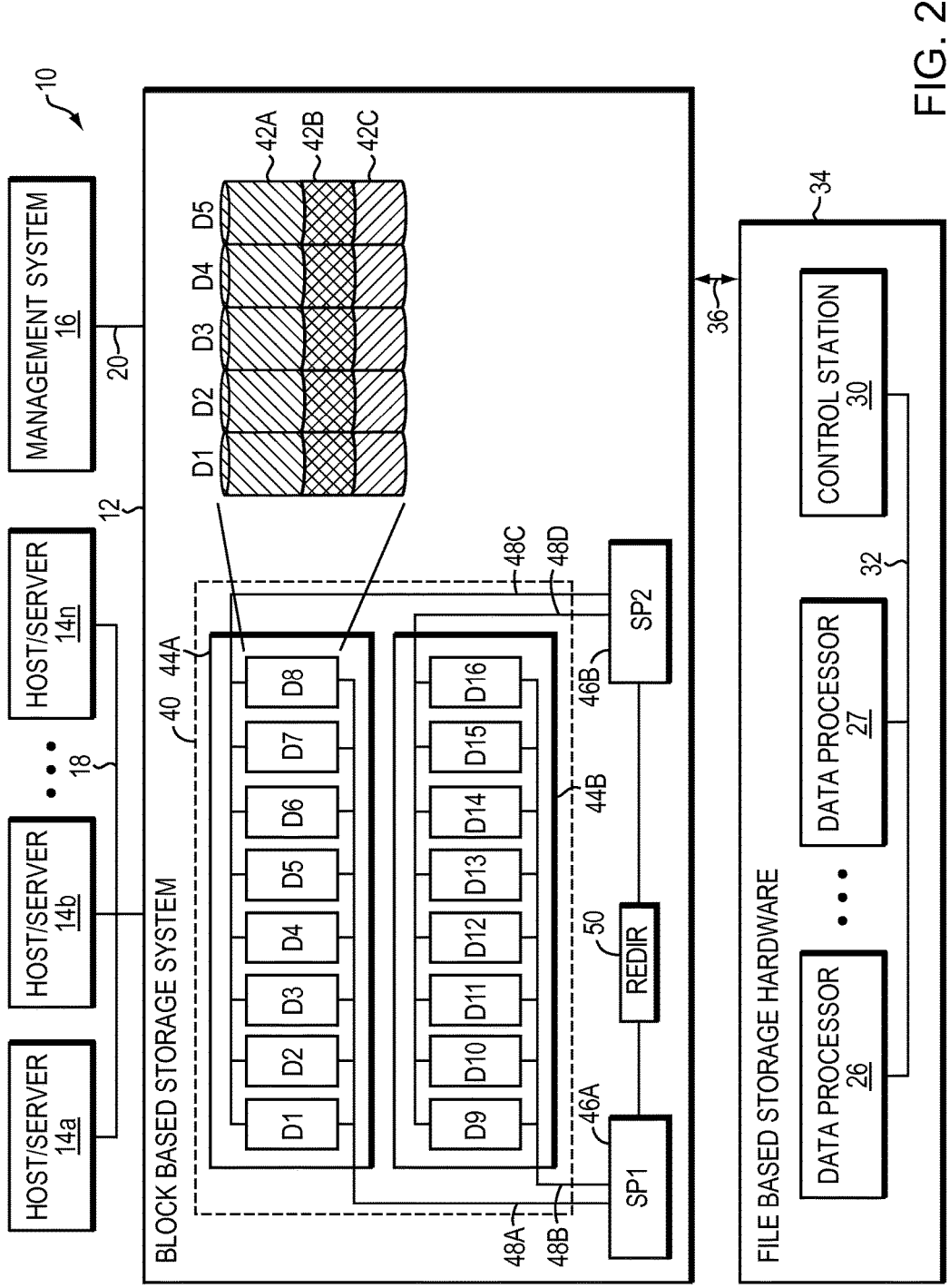

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 1, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
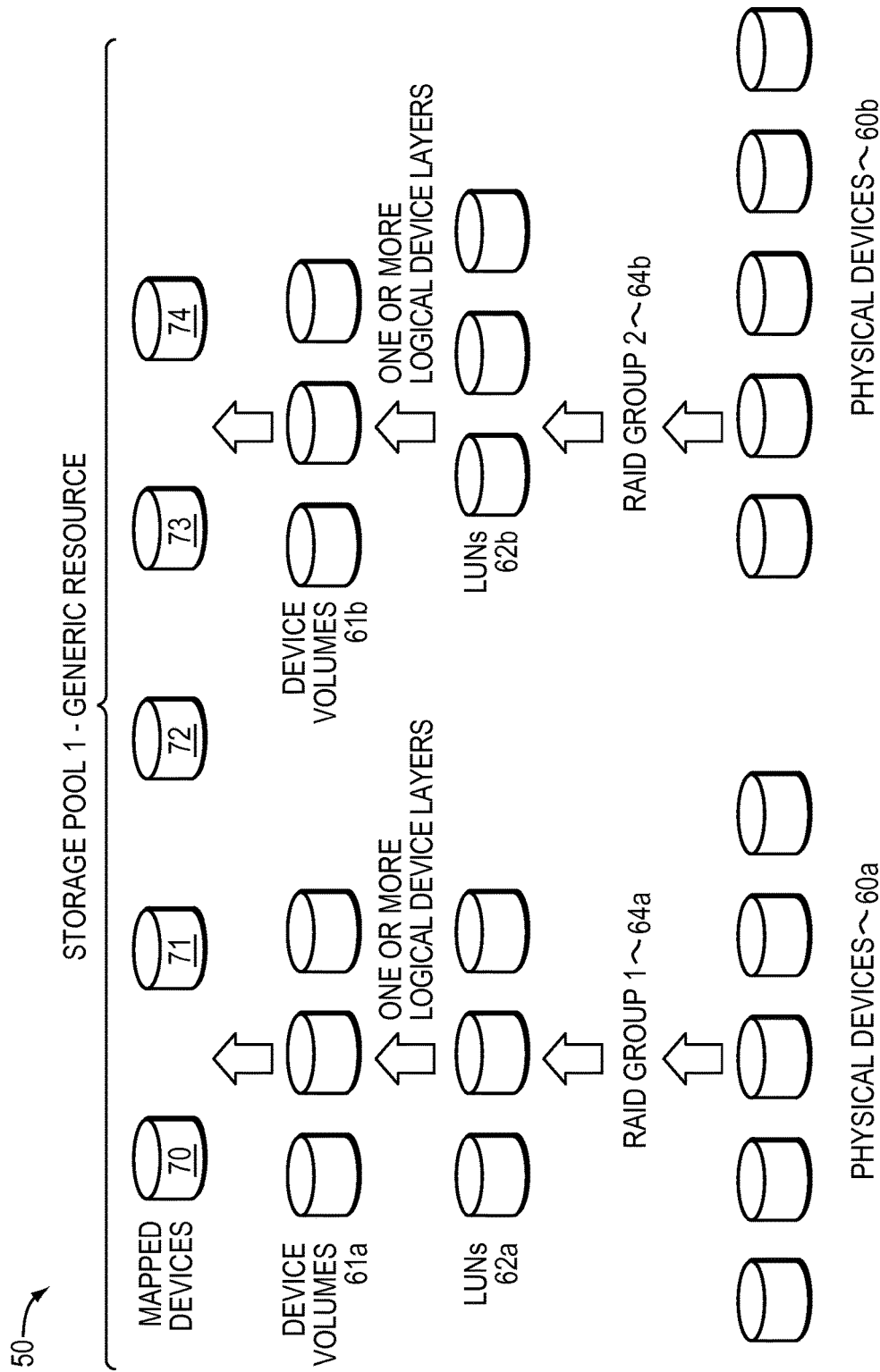
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61*a*-61*b*, which are logical devices that map logical storage space of the data device to physical storage space on the physical devices 60*a*-60*b*. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 4:
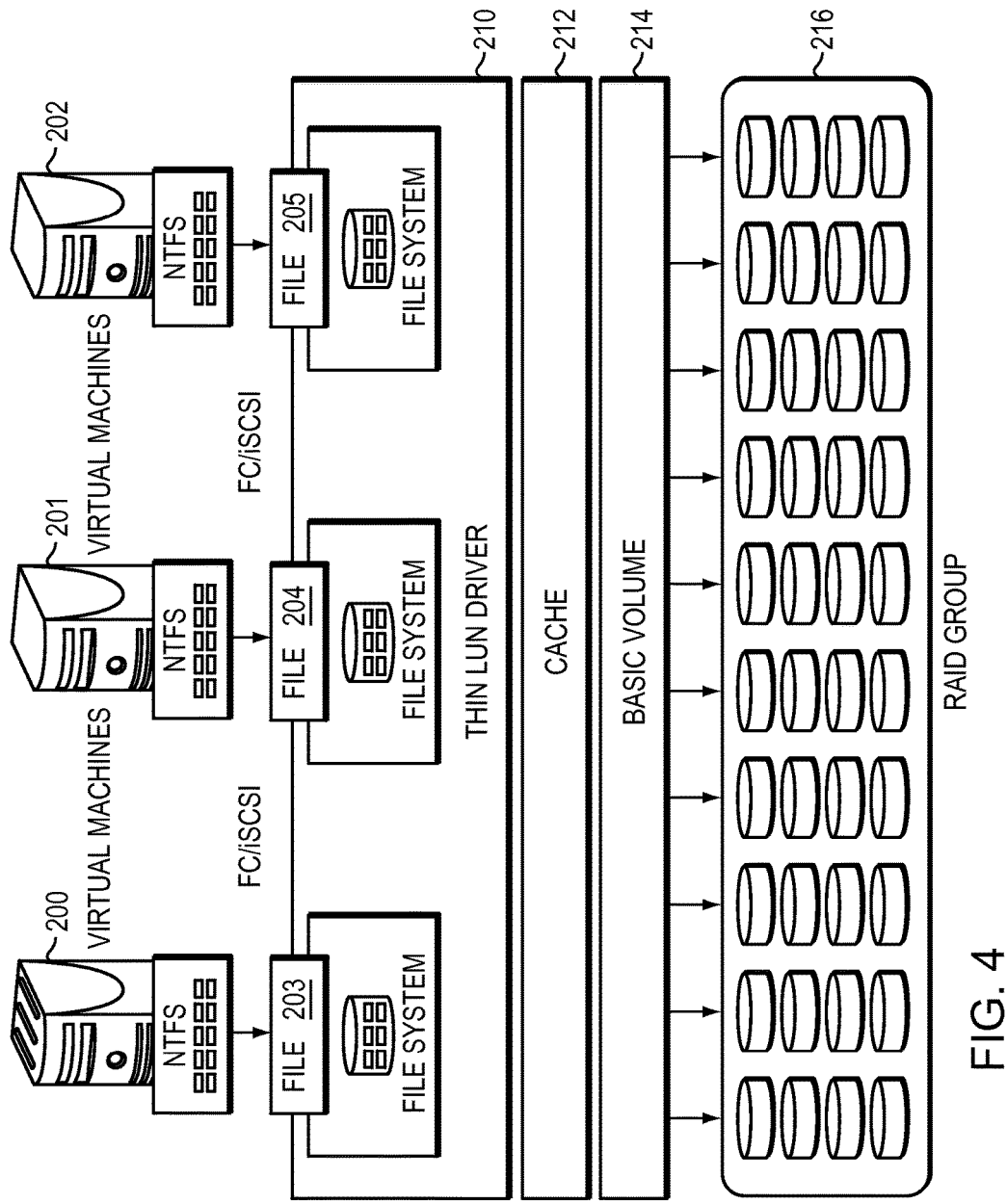
FIGS. 4-10 are diagrams illustrating in more detail components that may be used in connection with techniques herein.

Referring to FIG. 4, shown is a detailed representation of components that may be included in an embodiment using the techniques described herein. With reference also to FIGS. 1-3, in at least one embodiment of the current technique, physical storage is typically organized into storage pools, possibly in the form of RAID groups/sets 216. Storage pools are then subdivided into storage units (e.g., storage volumes 214 that are exposed to computer systems, e.g., as a file 203-205 organized on a mapped LUN by thin LUN driver 210 and file system logic communicating via Fibre Channel, iSCSI, etc.). In some environments, storage pools may be nested in a hierarchy, where pools are divided into sub-pools. In at least some cases, the term LUN may represent an address for an individual storage unit, and by extension, an identifier for a virtual disk of other storage device presented by a storage system.

Embodiments of the current technique may be understood in the context of virtual machines 200-202 (or virtual computers) that are presented or emulated within a virtualization system executing on underlying hardware facilities 216 provided by a storage system. Although certain virtualization strategies/designs are described herein, a virtualization system is representative of a wide variety of designs and implementations in which underlying hardware resources are presented to software (typically to operating system software and/or applications) as virtualized instances of computational systems that may or may not precisely correspond to the underlying physical hardware.

With respect to virtualization systems, the term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc.

As is well known in the field of computer science, a virtual machine ("VM") is a software abstraction—a "virtualization"—of an actual physical computer system. Some interface is generally provided between the guest software within a VM and the various hardware components and devices in the underlying hardware platform. This interface-which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/ structures described herein can be implemented in any of a variety of appropriate places within the overall structure of the virtualization software (or overall software environment that includes the virtualization software).

With respect to the virtual machine monitor, in view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Different systems may implement virtualization to different degrees—"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

In the preferred embodiment, the embodiment operates in cooperation and may be a part of computer software, operating the preferred EMC VNX and VNXe storage systems available from EMC Corporation of Hopkinton, Mass., although one skilled in the art will recognize that the current technique may be used with other data storage systems.

In the preferred embodiment, VMware virtual processing includes the VMware ESX Server technology and provides a VMM and a VM that has at least one virtual processor and is operatively connected to the VMM for running a sequence of VM instructions, which are either directly executable or non-directly executable.

In a preferred embodiment, referring to FIG. 4, a data storage environment is shown including a VMware Server having a series of Virtual Machines 200-202. Virtual machines 200-202 engages on data storage system files 203-205, where such files are designated with virtual drive designations.

Thus, for example, portions of storage may be provisioned from RAID group or pool 216 as file 203-205 (a mapped LUN organized on a basic volume and represented as a file) which may encode an encapsulation of an exposed virtual disk(s) and virtual machine state. A virtual machine is associated with a unique identifier and information about its virtual devices, including virtual disks.

Figure 5:
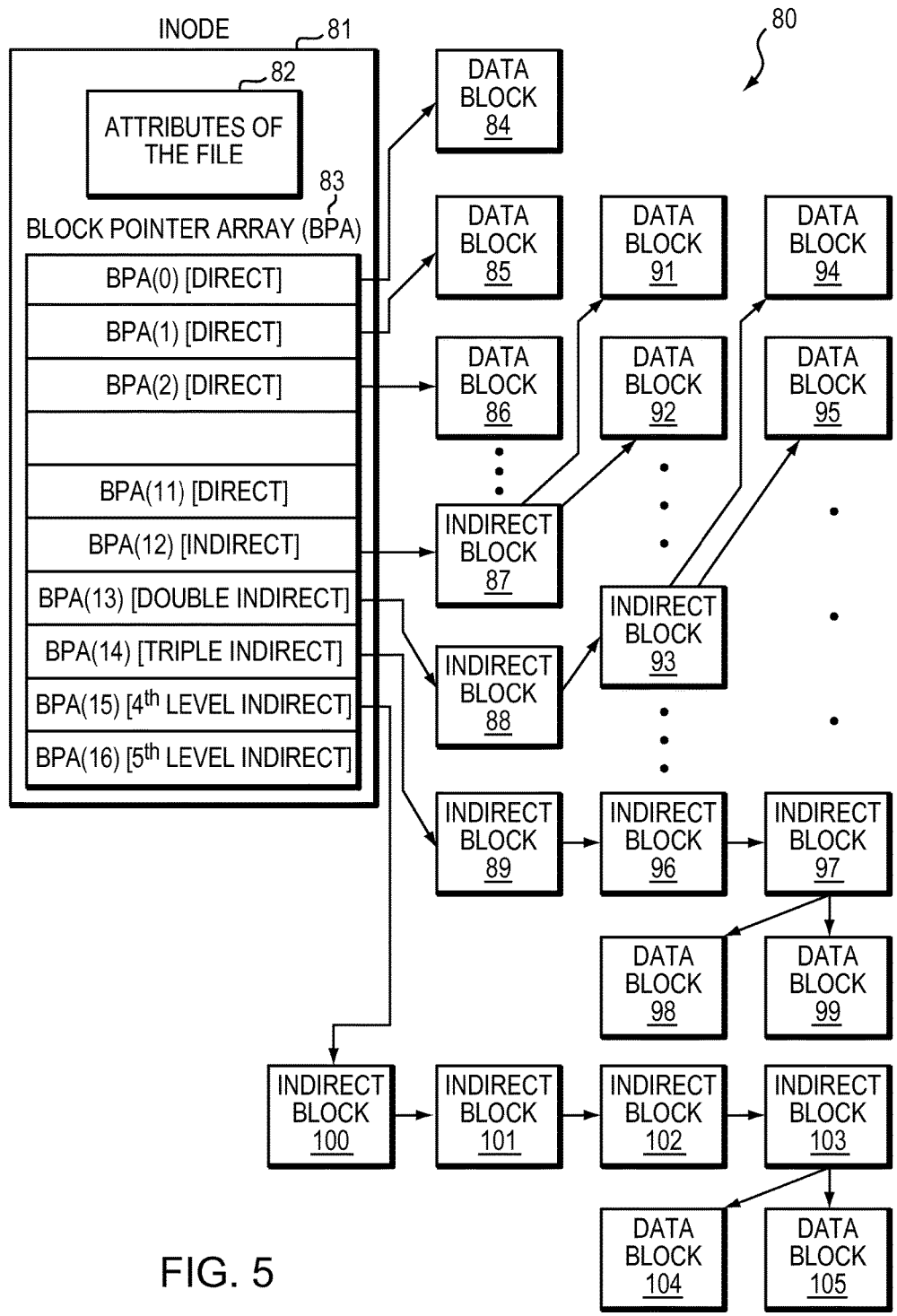

Referring to FIG. 5, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 6:
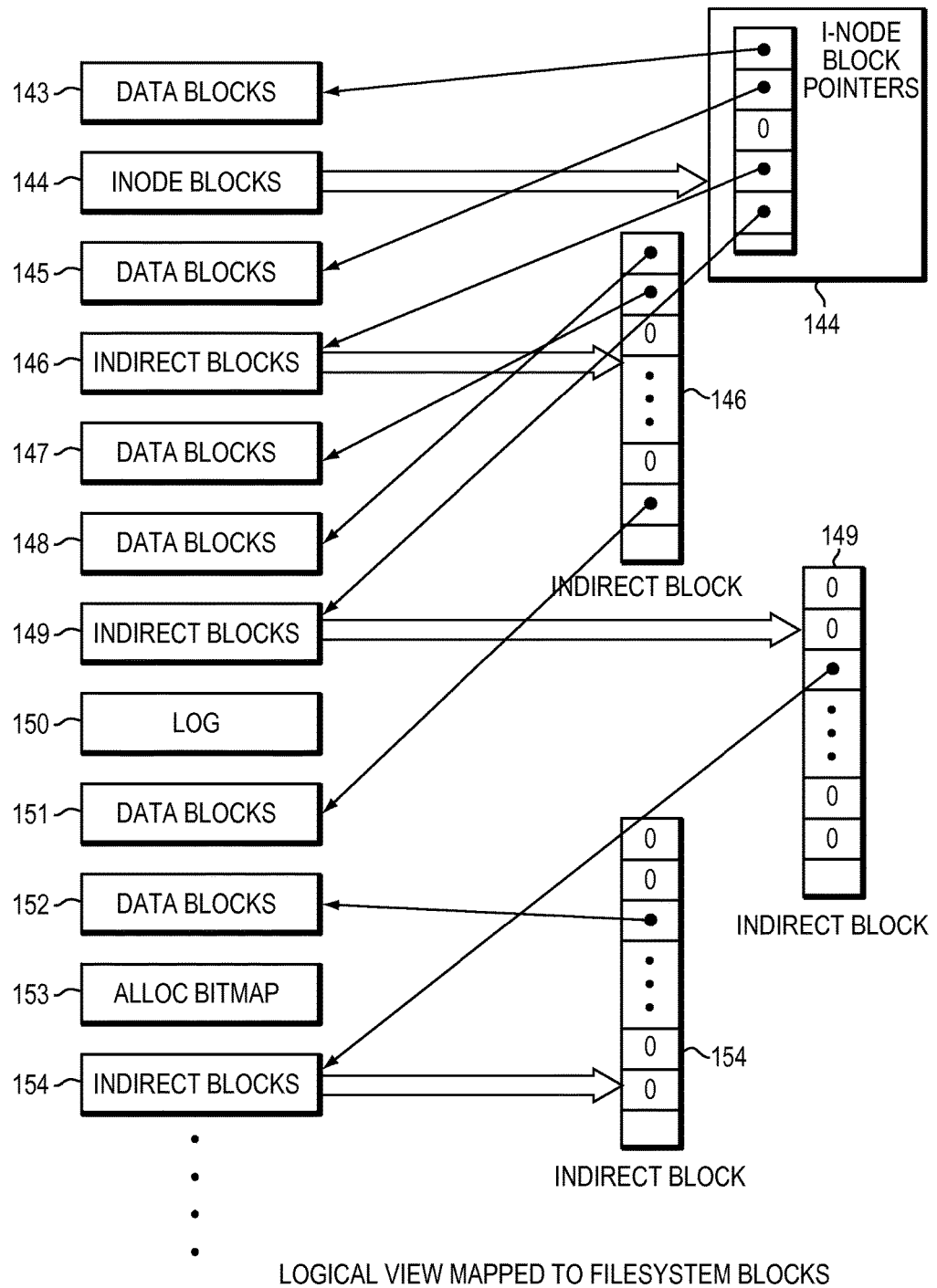

Referring to FIG. 6, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Thus, as described above herein, a file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Figure 7:
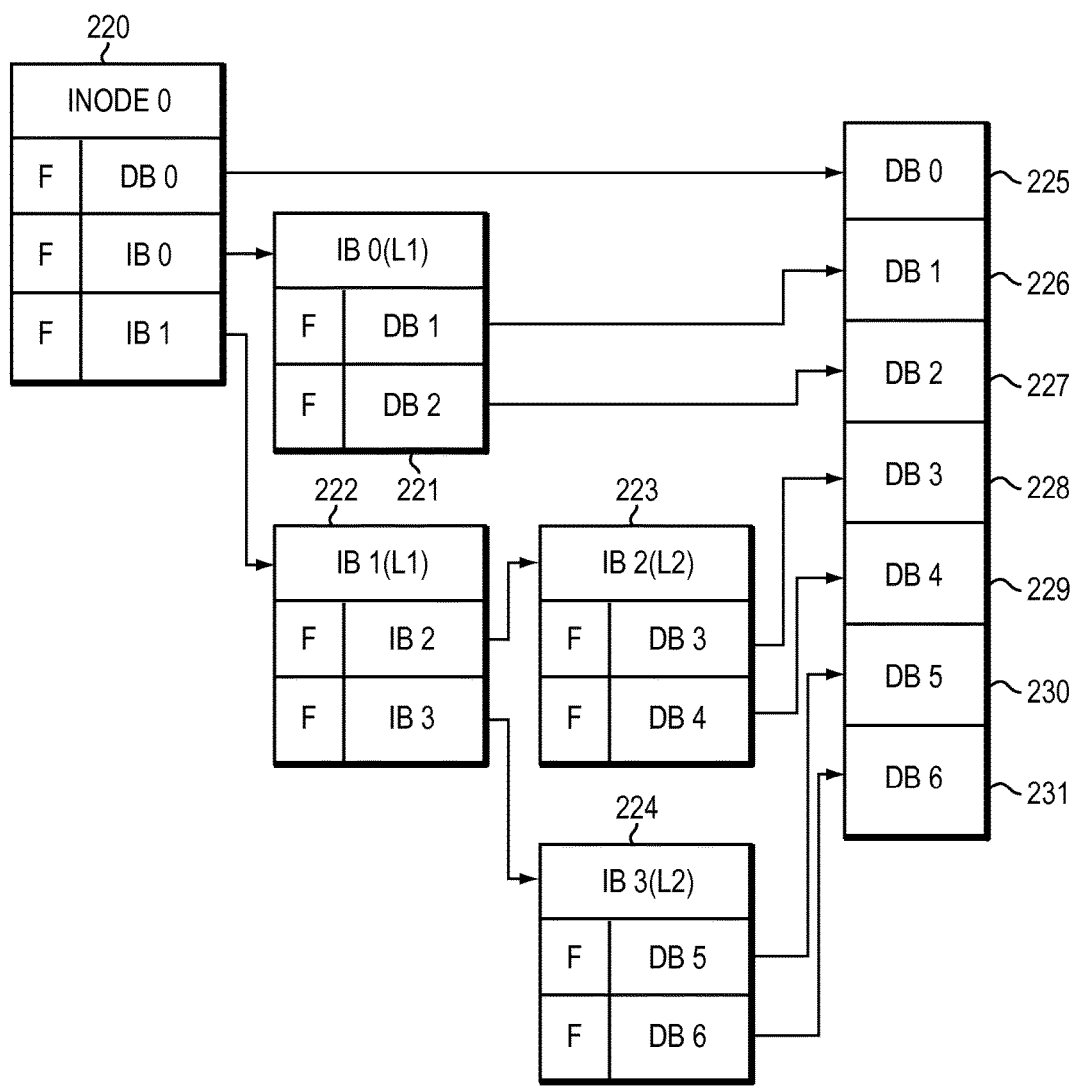

Referring to FIG. 7, shown is a detailed representation of components that may be included in an embodiment using the techniques described herein. FIG. 7 shows a file system hierarchy of a file system which may be exported as a virtual disk to a virtual machine in communication with a storage system and organized on a mapped LUN. In FIG. 7, inode 220 of a file points to indirect data blocks 221, 222 and file system data block DB0 225. Further, the indirect data block 222 points to another set of indirect data blocks 223, 224 where the indirect data block 223 points to file system data blocks DB3 228 and DB4 229 and the indirect data block 224 points to file system data blocks DB5 230 and DB6 231. Further, the indirect data block 221 points to file system data blocks DB1 226 and DB2 227. Further, in at least one embodiment of the current technique, a mapping pointer included in metadata of a file system block (such as indirect data block, data block) includes a flag that stores information (such as a bit) to indicate whether the file system block is a bad block (e.g., an inconsistent file system block).

Figure 8:
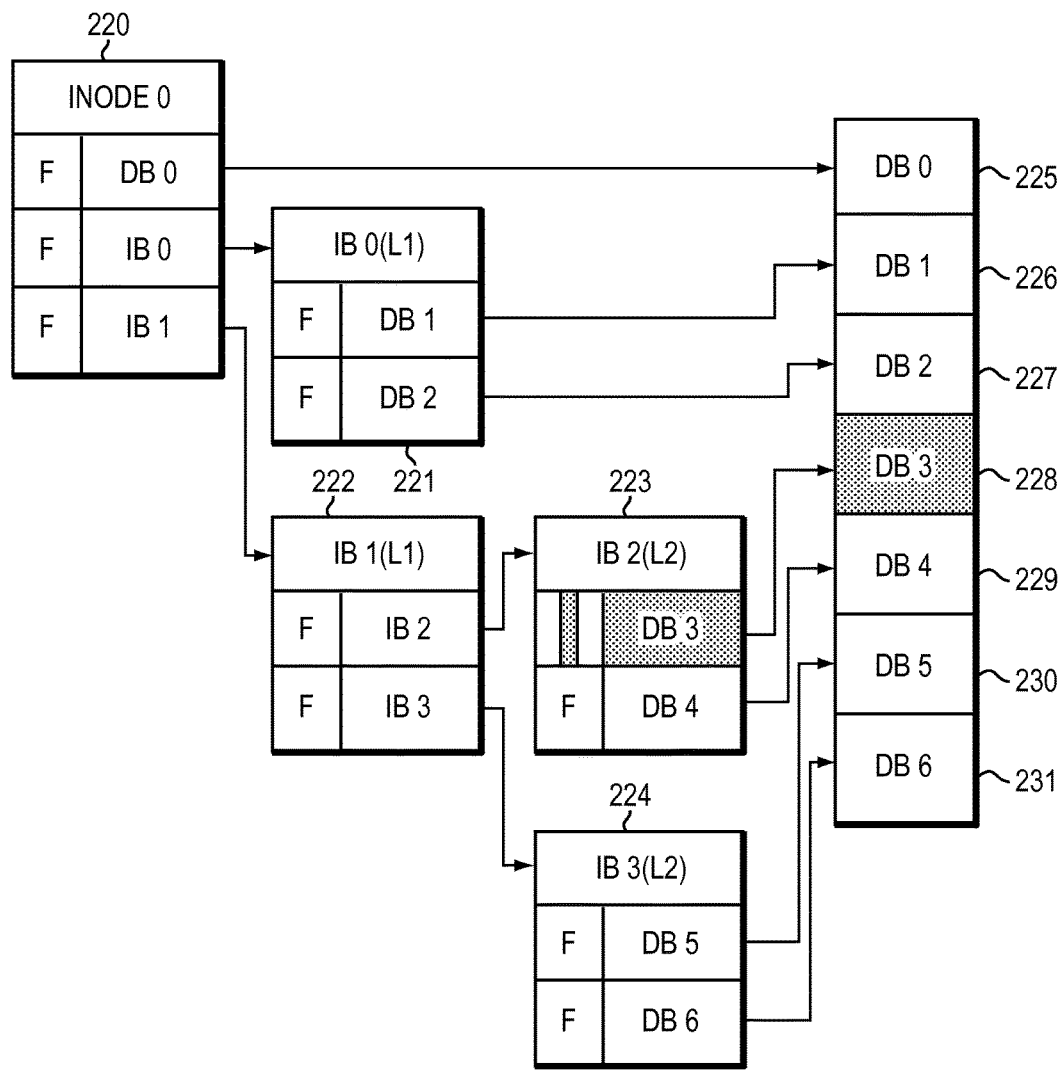

Referring to FIG. 8, shown is a detailed representation of components that may be included in an embodiment using the techniques described herein. With reference also to FIG. 7, FIG. 8 shows that data block DB3 228 has been detected as an inconsistent file system block and flag information included in the mapping pointer for DB3 228 has been updated to indicate that the file system data block DB3 is a bad block.

Figure 9:
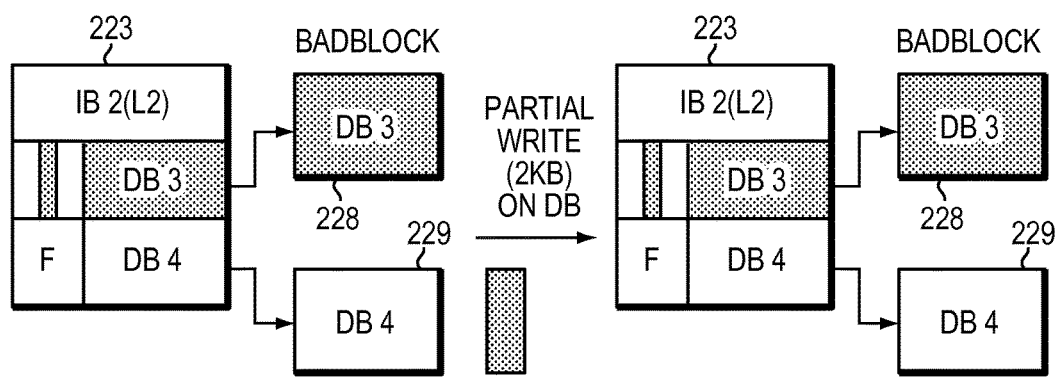

Referring to FIG. 9, shown is a detailed representation of components that may be included in an embodiment using the techniques described herein. With reference also to FIGS. 4-8, FIG. 9 describes a scenario where a partial write request is received by a storage system to write data to a portion of file system data block DB3 228 that has been identified as a bad block as illustrated in FIG. 8. In at least one embodiment of the current technique, instead of writing zeroes to the bad block DB3 228, a storage system reports an I/O error to a client (e.g., virtual machine 200-202) such that the client may take appropriate action based on the I/O error and information such as file name and file path provided to the client.

Figure 10:
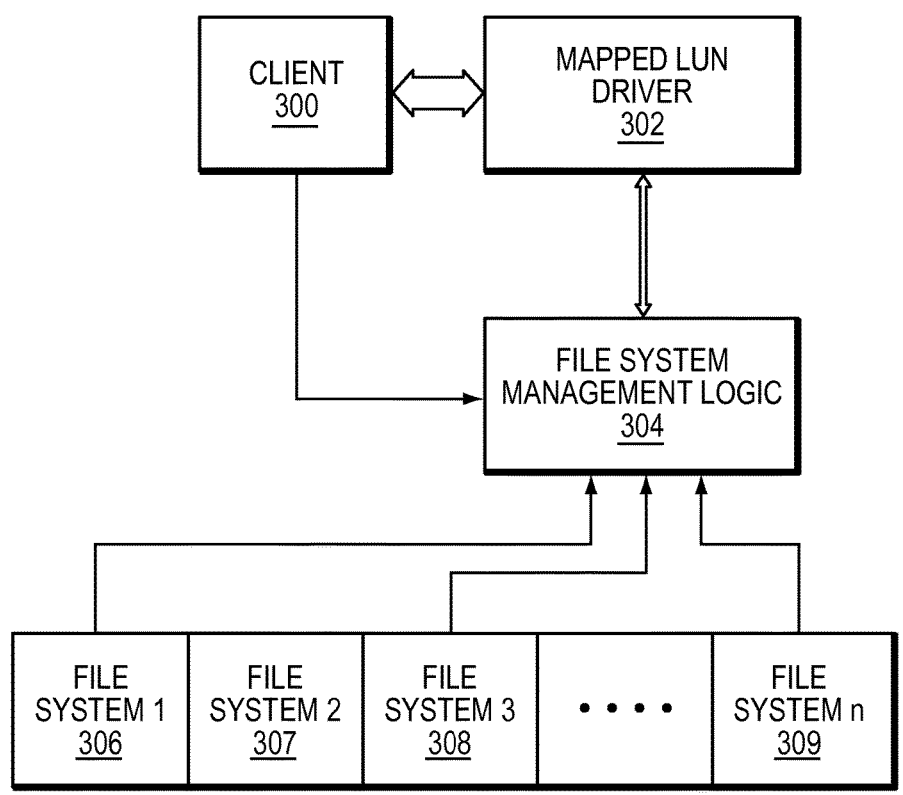

Referring to FIG. 10, shown is a detailed representation of components that may be included in an embodiment using the techniques described herein. With reference also to FIGS. 1-9, in at least one embodiment of the current technique, file system management logic 304 manages file systems 306-309 organized on mapped logical volumes managed by mapped LUN driver 302 and provides access to file systems 306-309 to clients 300 (e.g., a virtual client).

Generally, FSCK utility iterates over a file system block hierarchy of each inode of a file system. During iteration, the FSCK utility gathers metadata information for each file system block of each file system block hierarchy in the file system and creates metadata structures such as bitmaps for recovering inconsistent metadata. Further, during iteration, the FSCK utility identifies lost or corrupted portions of files of the file system. In a conventional system, the FSCK utility then attempts to recover the lost or corrupted portions of files of the file system by processing each lost file system block associated with the lost or corrupted portions of files by writing zeros to the lost or corrupted portions of files.

In contrast, in at least one embodiment of the current technique, when an inconsistent file system block is identified in a file system hierarchy of a file system by file system management logic 304 (which may include FSCK utility), an I/O error is reported back to a client 300 which makes a determination as to what action to take to recover the inconsistent file system block.

Figure 11:
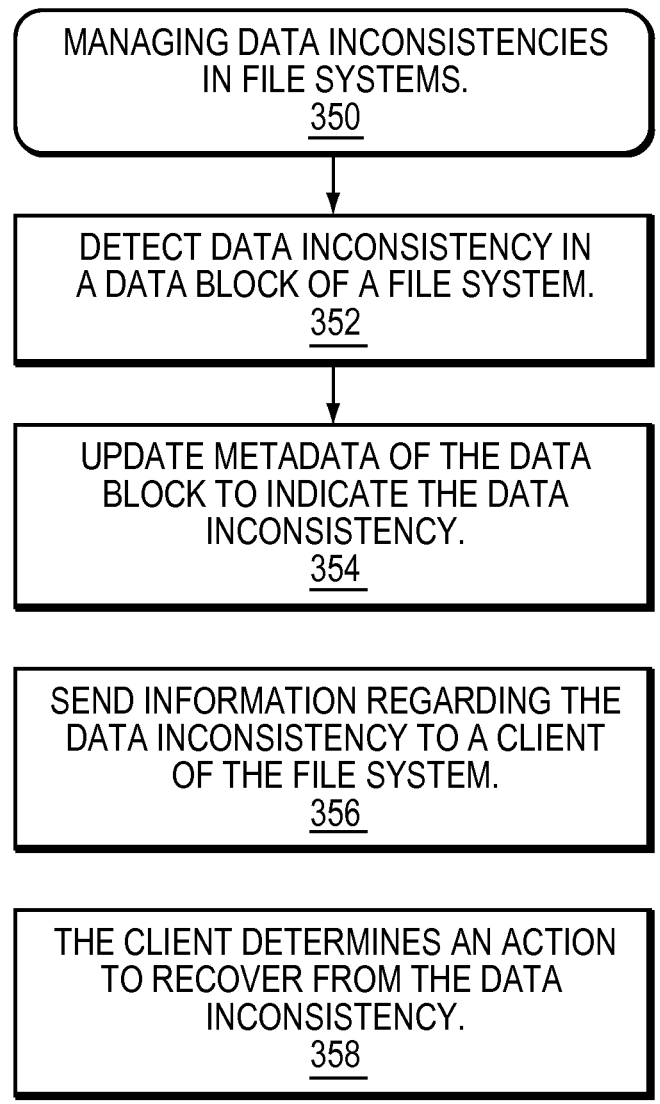
FIG. 11 is a flow diagram illustrating processes that may be used in connection with techniques herein.

Referring to FIG. 11, shown is a flow diagram illustrating the method of managing data inconsistencies in file systems. With reference also to FIGS. 1-10, in at least one embodiment of the current technique, data inconsistencies are managed in file systems (step 350). A data inconsistency in a file system data block of a file system is detected (step 352). Data inconsistencies in a file system data block may be detected either when the file system is being recovered by FSCK utility or when an I/O request is issued to the file system block. Metadata such as a flag in a mapping pointer of the file system data block that has been identified as inconsistent (also referred to herein as "bad block") is updated to indicate that the file system block no longer store valid data (step 354). Information regarding the data inconsistency is send to a client using the file system data block of the file system (step 356). The client then determines an action to recover data inconsistencies that have been identified in the file system data block (step 358).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data inconsistencies in file systems, the method comprising:

detecting, by a file system management logic, a data inconsistency in a file system data block of a file system, wherein the file system includes a set of file system data blocks;

updating mapping information of the file system data block to indicate that the file system data block no longer includes valid data of the file system;

reporting an I/O error to a client system, wherein a logical volume is exported to the client system for accessing the logical volume organized as the file system on a storage device of a storage system, wherein the client system is in communication with the storage system;

avoiding recovering the file system data block from the data inconsistency by a file system recovery utility, prior to providing the file system data block to the client system, by providing information regarding the data inconsistency to the client system to enable the client system to determine an action for recovering the file system data block, wherein the information includes a file name of a file of the file system including the file system data block and location information for the file system data block; and based on the information and the I/O error reported to the client system, determining, by the client system, the action for recovering from the data inconsistency, wherein the action indicates how the I/O error is resolved by the client system, and wherein the file system management logic avoids overwriting the file system data block prior to providing the file system data block to the client system, to allow the client system to determine the action for recovering from the data inconsistency, wherein avoiding overwriting the file system data block prior to providing the file system data block to the client system includes avoiding writing zeros to the filer system block by the file system recovery utility, wherein at least one action determined by the client system for recovering from the data inconsistency is selected from marking a logical volume associated with the file system data block offline, marking a portion of the logical volume as inconsistent, and starting a background process to fix the data inconsistency.

2. The method of claim 1, wherein the file system is represented by a file system hierarchy, the file system hierarchy including a set of indirect data blocks, each indirect data block including a set of data blocks.

3. The method of claim 1, wherein detecting the data inconsistency further comprising:

evaluating metadata of each file system data block of the set of file system data blocks.

4. The method of claim 3, wherein the metadata of a file system data block includes a flag indicating whether contents of the file system data block are inconsistent.

5. The method of claim 1, wherein the information regarding the data inconsistency provided to the client of the file system includes an I/O error, wherein the I/O error includes a file name, file path name, and an offset for the file system data block.

6. The method of claim 1, wherein the client is a virtual machine, wherein the file system is presented as a virtual disk to the virtual machine.

7. The method of claim 1, wherein the client performs the action based on the information provided to the client.

8. The method of claim 1, further comprising:

avoiding writing zeros to the file system data block upon detecting the data inconsistency in the file system data block.

9. The method of claim 1, wherein the data inconsistency is detected upon performing a write operation on the file system data block.

10. The method of claim 1, wherein the data inconsistency is detected upon performing a file system recovery operation on the file system data block.

11. A system for use in managing data inconsistencies in file systems, the system comprising a processor configured to:
- detect, by a file system management logic, a data inconsistency in a file system data block of a file system, wherein the file system includes a set of file system data blocks;
- update mapping information of the file system data block to indicate that the file system data block no longer includes valid data of the file system;
- report an I/O error to a client system, wherein a logical volume is exported to the client system for accessing the logical volume organized as the file system on a storage device of a storage system, wherein the client system is in communication with the storage system;
- avoid recovering the file system data block from the data inconsistency by a file system recovery utility, prior to providing the file system data block to the client systems by providing information regarding the data inconsistency to the client system to enable the client system to determine an action for recovering the file system data block, wherein the information includes a file name of a file of the file system including the file system data block and location information for the file system data block; and
- based on the information and the I/O error reported to the client system, determine, by the client system, the action for recovering from the data inconsistency, wherein the action indicates how the I/O error is resolved by the client system, and wherein the file system management logic avoids overwriting the file system data block prior to providing the file system data block to the client system, to allow the client system to determine the action for recovering from the data inconsistency, wherein avoiding overwriting the file system data block prior to providing the file system data block to the client system includes avoiding writing zeros to the filer system block by the file system recovery utility, wherein at least one action determined by the client system for recovering from the data inconsistency is selected from marking a logical volume associated with the file system data block offline, marking a portion of the logical volume as inconsistent, and starting a background process to fix the data inconsistency.

12. The system of claim 11, wherein the file system is represented by a file system hierarchy, the file system hierarchy including a set of indirect data blocks, each indirect data block including a set of data blocks.

13. The system of claim 11, wherein detecting the data inconsistency further comprising:
- evaluating metadata of each file system data block of the set of file system data blocks.

14. The system of claim 13, wherein the metadata of a file system data block includes a flag indicating whether contents of the file system data block are inconsistent.

15. The system of claim 11, wherein the information regarding the data inconsistency provided to the client of the file system includes an I/O error, wherein the I/O error includes a file name, file path name, and an offset for the file system data block.

16. The system of claim 11, wherein the client is a virtual machine, wherein the file system is presented as a virtual disk to the virtual machine.

17. The system of claim 11, wherein the client performs the action based on the information provided to the client.

18. The system of claim 11, further comprising:
- avoid writing zeros to the file system data block upon detecting the data inconsistency in the file system data block.

19. The system of claim 11, wherein the data inconsistency is detected upon performing a write operation on the file system data block.

20. The system of claim 11, wherein the data inconsistency is detected upon performing a file system recovery operation on the file system data block.

* * * * *